July 31, 1962
R. H. FREDERICKS
3,047,324
DOOR LATCH MECHANISM
Filed June 13, 1955
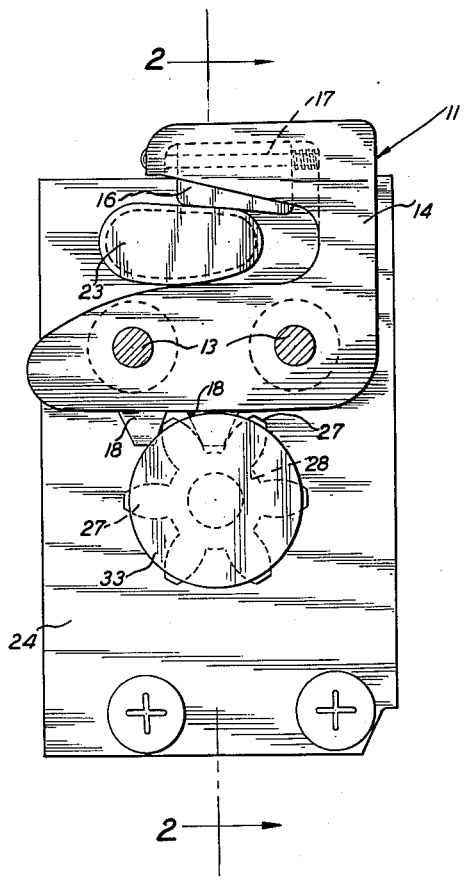
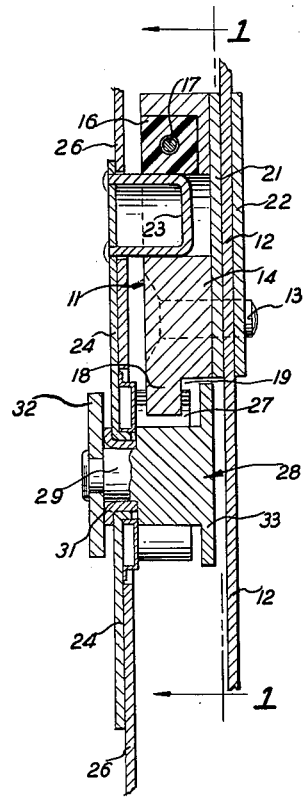
FIG.1
FIG.2
R.H. FREDERICKS
INVENTOR.
BY E.C. McRae
J.R. Faulkner
D.H. Oster

United States Patent Office 3,047,324
Patented July 31, 1962

3,047,324
DOOR LATCH MECHANISM
Robert H. Fredericks, Dearborn, Mich., assignor to Ford Motor Company, Dearborn, Mich., a corporation of Delaware
Filed June 13, 1955, Ser. No. 515,017
2 Claims. (Cl. 292—280)

This invention relates generally to a door latch mechanism for a motor vehicle.

An object of the present invention is to provide a motor vehicle door latch mechanism having provision for limiting relative movement between a toothed rotor and a toothed keeper to prevent possible disengagement therebetween which might occur during an accident as the result of relative longitudinal distortion or movement between the vehicle door and the adjacent pillar. In an embodiment of the invention this is accomplished by providing a flange on the rotor overlapping the teeth on the keeper to provide an overlap or interference therebetween. A safety feature is thus provided.

Other objects and advantages of this invention will be made more apparent as this description proceeds, particularly when considered in connection with the accompanying drawings, wherein:

FIGURE 1 is a vertical cross sectional view of a motor vehicle door latch mechanism incorporating the present invention, taken on the line 1—1 of FIGURE 2.

FIGURE 2 is a vertical cross sectional view taken on the line 2—2 of FIGURE 1.

Referring now to the drawing, the reference character 11 indicates generally a keeper assembly mounted upon the face of the motor vehicle door or body pillar 12 by means of bolts 13. The frame 14 of the keeper may be a die casting, and is generally C-shaped in elevation. A nylon wedge 16 is slidably mounted in a recess in the upper portion of the keeper frame for sliding movement upon a pin 17. A pair of teeth 18 project downwardly from the lower portion of the keeper frame 14, and it will be noted from an examination of FIGURE 2 that the teeth 18 are thinner than the keeper frame 14 to provide a clearance space 19 between the teeth 18 and the pillar 12. A shim 21 is provided between the keeper and the pillar, and a tapped plate 22 on the opposite side of the pillar forms a reinforcement and receives the bolts 13 mounting the keeper upon the body pillar.

The nylon wedge 16 slidably carried by the keeper 11 is arranged to engage a sheet metal dovetail 23 mounted upon a lock plate 24 secured to the end wall 26 of the vehicle door.

The teeth 18 of the keeper frame 14 are arranged to engage the equally spaced peripheral teeth 27 of a rotor bolt 28. As best seen in FIGURE 2, the rotor bolt 28 has a stepped shank 29 rotatably mounted in a bushing 31 projecting through an opening in the lock plate 24. A ratchet 32 is nonrotatably secured to the shank 29 of the rotor bolt to form an assembly therewith.

It will be apparent from the foregoing that the teeth 18 on the keeper 11 conventionally engage the teeth 27 of the rotor bolt 28 to hold the vehicle door in closed position until the rotor bolt is released for free rotation by means of conventional lock mechanism (not shown).

A disc-like flange 33 is integrally formed at the outer side of the rotor bolt 28. The flange 33 has a diameter approximating the diameter of the toothed portion 27 of the rotor bolt and projects into the clearance space 19 formed between the offset keeper teeth 18 and the body pillar 22. The peripheral portion of the rotor bolt flange 33 thus overlaps the tooth 18 of the keeper which is positioned in holding engagement with the rotor bolt when the door is closed. Consequently, the flange 33 serves to limit relative movement between the keeper 11 and the rotor bolt 28 in a direction axially of the rotor bolt or, in other words, longitudinally of the vehicle.

This structure protects against inadvertent opening of the door during an accident, since the overlap or interference between the rotor bolt flange 33 and the adjacent keeper tooth 18 prevents sufficient axial or longitudinal movement between the rotor bolt and the keeper to cause disengagement between the teeth 27 and 18. Although relative movement is thus limited, sufficient clearance is provided to accommodate normal body movements and to allow for manufacturing and assembling variations.

The flange 33 is shown as being integrally formed with the rotor bolt 28, but it may also be formed as a separate member suitably secured thereto. The circular or disclike shape of the flange 33 permits proper overlapping of the keeper teeth regardless of the rotary movement of the bolt.

It will be understood that the invention is not to be limited to the exact construction shown and described, but that various changes and modifications may be made without departing from the spirit and scope of the invention, as defined in the appended claims.

What is claimed is:

1. In combination, a rotatable latch device mounted on the free edge wall of a swinging door, said latch device being axially divided into a rotatable plate portion and a rotatable portion having tooth-like projections thereon, a keeper device mounted on the jamb face of a door framing member, said keeper device having projections forming tooth spaces to receive said tooth-like projections and a recess to receive said plate portion when said door is in closed position, said plate portion being adapted to coact with said keeper projections to resist any force urging the free edge wall of the door away from said jamb face thereby preventing lateral disengagement of said projections when in mesh with each other.

2. In a door latch mechanism for latching a motor vehicle door member to an adjacent motor vehicle body member, a multitoothed latch element mounted upon one of said members for rotation about an axis extending longitudinally of the vehicle, a keeper element rigidly mounted upon the other of said members for engagement by said latch element when the vehicle door is closed, said keeper element having a toothed portion thereon spaced from the member on which said keeper element is mounted, and a flange carried by said latch element extending into the space between said toothed portion and the member on which said keeper element is mounted when the keeper element is engaged by said latch element, said flange overlapping at least one tooth on said keeper element when the door is closed to limit relative movement of said latch and keeper elements away from each other in a direction longitudinally of the vehicle to prevent disengagement between the teeth of said latch and keeper elements.

References Cited in the file of this patent
UNITED STATES PATENTS 2,198,548    Marple _____ Apr. 23, 1940
2,458,751    Voight _____ Jan. 11, 1949